United States Patent [19]

Yamamoto et al.

[11] Patent Number: 5,576,149
[45] Date of Patent: Nov. 19, 1996

[54] METHOD FOR PRODUCING A TAPERED WAVEGUIDE

[75] Inventors: Hiroyuki Yamamoto; Yukio Kurata, both of Tenri; Keiji Sakai; Yoshio Yoshida, both of Nara; Kuniaki Okada, Tenri; Kouji Minami, Gose, all of Japan

[73] Assignee: Sharp Kabushiki Kaisha, Osaka, Japan

[21] Appl. No.: 337,247

[22] Filed: Nov. 10, 1994

[30] Foreign Application Priority Data

Nov. 10, 1993 [JP] Japan .................................. 5-280768

[51] Int. Cl.$^6$ .................................................. G03C 5/00
[52] U.S. Cl. ...................... 430/321; 385/43; 204/192.26; 427/163.2
[58] Field of Search ...................... 385/43; 204/192.26; 427/163.2; 430/321, 315

[56] References Cited

U.S. PATENT DOCUMENTS

| 4,256,816 | 3/1981 | Dunkleberger ........................... 430/11 |
| 5,439,782 | 8/1995 | Haemmerle et al. ..................... 430/321 |

FOREIGN PATENT DOCUMENTS

| 1-282510 | 11/1989 | Japan ........................................ 385/43 |
| 1-282511 | 11/1989 | Japan ........................................ 385/43 |
| 4-55802 | 2/1992 | Japan . |
| 4-289531 | 10/1992 | Japan . |

OTHER PUBLICATIONS

Yamaguchi, N., et al., "Low-loss spot-size transformer by dual tapered waveguides (DTW-SST)" *Journal of Lightwave Technology* (1990) 8(4):587-593.

Kishioka, K., "Lightwave coupler utilizing a tapered buffer layer" *Applied Optics* (1988) 27(11):2339-2343.

*Primary Examiner*—John A. McPherson
*Attorney, Agent, or Firm*—Morrison & Foerster

[57] ABSTRACT

A method for producing a tapered waveguide layer is disclosed. The method includes the steps of: forming a resist pattern on a substrate; setting the substrate in an apparatus for forming a film such that particles constituting the film reach the substrate from a direction which is oblique relative to the substrate; forming the film on a region of a surface of the substrate which is not covered by the resist pattern, the film having a thickness distribution corresponding to a shadow which the resist pattern creates on the substrate in accordance with an angle between the substrate and the direction; and removing the resist pattern, thereby forming the tapered waveguide layer consisting of the film on the substrate.

12 Claims, 4 Drawing Sheets

METHOD FOR PRODUCING A TAPERED WAVEGUIDE

BACKGROUND OF THE INVENTION

1. Field of the Invention

The present invention relates to a method for producing a tapered waveguide on a substrate. In particular, the present invention relates to a method for producing a tapered waveguide used in an optical integrated circuit device.

2. Description of the Related Art

Recently, optical parts have been more and more miniaturized and integrated. Consequently, technologies for producing such optical parts in the order of a sub-micron have been established. For example, in the normal formation of a thin film or etching for producing such optical parts, the thickness of a film or the depth of the etching is generally made uniform (processing on a face parallel to a substrate) by keeping the speed as constant as possible. However, in some cases, a tapered structure is obtained by intentionally varying the speed. In particular, a tapered region (a tapered waveguide) in an optical waveguide is an important structure used for bending light in the thickness direction and making the light travel across the boundary of regions having different effective refractive indices to each other without any loss of light.

FIG. 5 shows a side view of an optical integrated circuit device 20 used in a conventional optical information recording/reproducing apparatus (Japanese Laid-Open Patent Publication No. 4-289531). An optical waveguide layer 23 formed on a buffer layer 22 which is disposed on a substrate 21 is optically connected to a photodetector 24 formed in the substrate 21. A first gap layer 25 having a lower refractive index than that of the optical waveguide layer 23 is formed on the optical waveguide layer 23. A second gap layer 26 having an opening 27 and a lower refractive index than that of the optical waveguide layer 23 is formed on the first gap layer 25. An adhesive layer 28 filling the opening 27 of the second gap layer 26 is optically connected to the first gap layer 25. A prism 29 is bonded and fixed onto the adhesive layer 28. The prism 29 is made of a dielectric material having a higher refractive index than that of the optical waveguide layer 23. Light emitted from a semiconductor laser 16 travels through a collimator lens 17 and an objective lens 18 to be radiated onto an optical disk 19. The light reflected at the optical disk 19 enters a photo-detecting element 20 from the opening 27, and then is detected by the photodetector 24. The second gap layer 26 has a tapered region 26a.

FIG. 6 shows another optical waveguide having a tapered region (Japanese Laid-Open Patent Publication No. 4-55802). A light-receiving element 45 is formed in a substrate 41. A buffer layer 42 having a tapered region 44 which partially overlaps the light-receiving element 45 is formed on the substrate 41. An optical waveguide 43 is formed on the buffer layer 42 and the light-receiving element 45. Light propagates through the optical waveguide 43 and enters the light-receiving element 45.

Next, a method for producing these tapered regions will be described. The following methods are considered to be applicable for forming the tapered regions. Part of a substrate on which a film having a tapered region is formed is shielded with a shielding structure and a dielectric film is deposited on the substrate by using a known sputtering method, a vapor deposition method, and a CVD method, thereby forming the tapered region. Alternatively, a tapered region is formed by dry etching, wet etching, ion milling, cutting, grinding, oxidation and the like. Among them, examples of application of a shadow mask method and an etching method will be shown with figures.

Referring to FIG. 7, the shadow mask sputtering method (Journal of Lightwave Technology, Vol. 8, No. 4, pp. 587 to 593, April 1990) will be explained. A mask 61 made of metal is located a certain distance away from an Si substrate 63 by a spacer 62 made of silicon. When the sputtering is performed from the upper part under such a state, the thickness of a film is partially varied since the sputtered particles arrive at the portion shaded by the mask 61. As a result, a portion 64 having a tapered structure is formed as shown in FIG. 7. The shape of the tapered region depends on the cross-sectional shape of the mask, the distance between the mask and the substrate, the size of a target, the distance from the substrate, and the like. The shape of the tapered region is basically determined by the dim shade created by the mask. The reason why the dimness of the shade is caused is that some of sputtered particles are oriented downward and some of them are oriented obliquely.

FIGS. 8A to 8I show a fabrication process for a tapered region. After a first thermal oxidation (silicon oxide) film 52 is formed on an Si substrate 51, a second silicon oxide film 53 capable of controlling the speed of etching is formed on the first thermal oxidation film 52. A photoresist pattern 54 is formed on the second silicon oxide film 53 (FIGS. 8B to 8E). Since the etching speed in the second silicon oxide film 53 is higher than that in the first thermal oxidation film 52 serving as a buffer layer, the etching advances inside the photoresist pattern 54. However, since the etching speed is relatively low in the first thermal oxidation film 52, the first thermal oxidation film 52 is etched little by little in proportion to the time period where the first thermal oxidation film 52 is in contact with etchant. Therefore, the side of the first thermal oxidation film 52 in contact with the photoresist pattern 54 is more etched, and the side of the buffer layer 52 in contact with the substrate 51 is less etched, resulting in a tapered region 55 shown in FIG. 8I. Consequently, an optical waveguide is formed on the first thermal oxidation film 52 having the resultant tapered region 55 (Japanese Laid-Open Patent Publication No. 4-55802).

However, since the tapered region obtained by the above shadow mask method has the thickness of the mask and the height of the spacer of about 1 mm, respectively, a thin film with a tapered region of several mm in length is obtained. Such a long tapered region prevents the device from being miniaturized and integrated. Operations such as application, removal, and washing of a shadow mask make the realization of mass production difficult.

On the other hand, although a taper having a relatively short length can be obtained by wet etching, the etched surface is deteriorated from the time when the film is formed, the surface loses its smoothness and is roughened. This results in optical loss.

SUMMARY OF THE INVENTION

A method for producing a tapered waveguide layer of the present invention includes the steps of: forming a resist pattern on a substrate; setting the substrate in an apparatus for forming a film such that particles constituting the film reach the substrate from a direction which is oblique relative to the substrate; forming the film on a region of a surface of the substrate which is not covered with the resist pattern, the film having a thickness distribution corresponding to a shadow which the resist pattern creates on the substrate in accordance with an angle between the substrate and the direction; and removing the resist pattern, thereby forming the tapered waveguide layer consisting of the film on the substrate.

In one embodiment of the invention, the step of setting the substrate includes the step of holding the substrate with the substrate tilted relative to a sample table of the apparatus.

In another embodiment of the invention, the apparatus is a sputtering apparatus for forming the film by a sputtering method, and the step of setting the substrate includes the step of holding the substrate such that the region is positioned outside a region which is directly under a target of the sputtering apparatus.

According to the method of the invention, a tapered waveguide having a short tapered region (having a length almost equal to the thickness of the photoresist, i.e., about 1 μm) and suitable for being integrated without optical loss can be effectively formed by the application of IC technology.

Thus, the invention described herein makes possible the advantage of providing a method for producing a tapered waveguide in which the above problems are solved.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples, with reference to the accompanying drawings.

Figure 1:
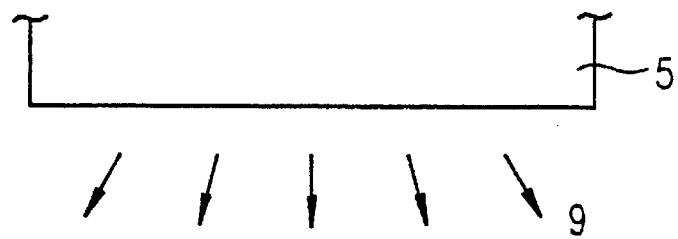
FIG. 1 is a side view showing an example of the present invention.
Figure 1:
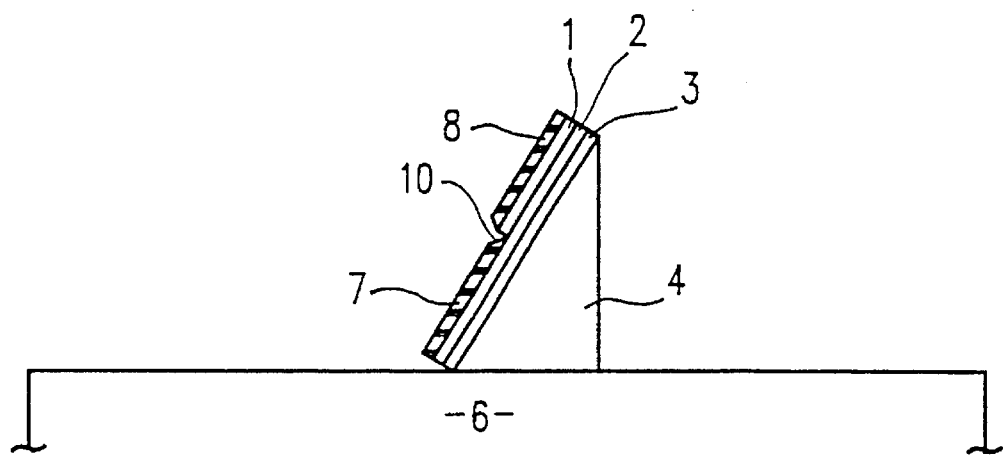

An example of the present invention will be described with reference to FIG. 1. A film is formed, for example, by using a sputtering apparatus. As shown in FIG. 1, a substrate 2, on which a photoresist pattern 1 is formed, is positioned between a target 5 and a sample table 6 of the sputtering apparatus so as to be leaned against a tool 4. The sample table 6 is cooled by a chiller (not shown) so that the temperature of a substrate usually held on the sample 6 table does not rise during the formation of a film. According to the invention, since the substrate 2 is not in direct contact with the sample table 6, the tool 4 is preferably made of a metal having a good thermal conductivity so that the substrate 2 is sufficiently cooled by the chiller through the tool 4 and the sample table 6. In addition, a vacuum grease 3 fills the gap between the tool 4 and the substrate 2 for further improvement of the thermal radiation efficiency. The target 5 is a source of the depositing film and consists of a material which is transparent against a light as a waveguide layer and has a predetermined refractive index.

During the sputtering, particles 9 sputtered from the target 5 go toward the sample table 6 and the substrate 2. Even though the particles 9 may be scattered by collisions with each other at a ratio based on the sputtering pressure, most of the particles 9 mainly travel from the target 5 to the sample table 6. Because the substrate 2 is tilted relative to a surface of the sample table 6, the particles 9 reach the substrate 2 from an incident direction which is oblique relative to the substrate 2. The target 5 is located toward the incident direction from a point on the substrate 2. Then, a film is deposited on the region of surface of the substrate 2 which is not covered with the photoresist pattern 1, having a thickness distribution (sputtering rate) corresponding to the shadow which the photoresist pattern 1 creates on the substrate 2 in accordance with an angle between the substrate 2 and the incident direction.

After the film is formed, the photoresist pattern 1 is removed by a lift-off method. More specifically, the photoresist pattern 1 and an unnecessary film 8 formed thereon are removed with a solvent capable of dissolving the photoresist pattern 1 such as acetone, thereby obtaining a film 7 having a purposed tapered region 10. The shape of the taper, as described below, practically depends on the size of the target, the distance from the substrate, the thickness of the photoresist pattern and the like.

Figure 2:
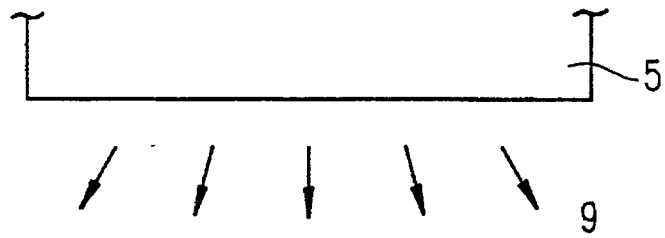
FIG. 2 is a side view showing another example of the present invention.
Figure 2:
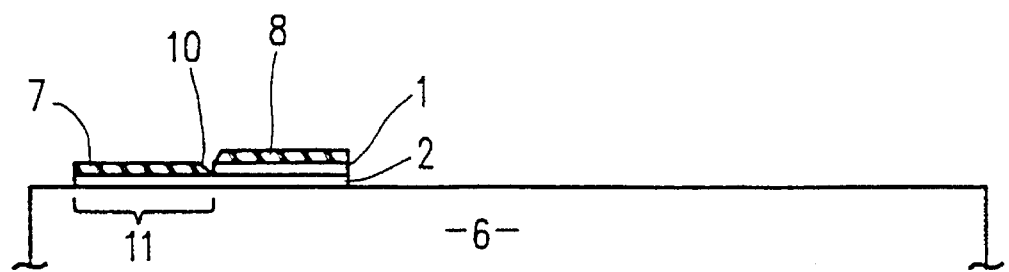

Next, another example will be described with reference to FIG. 2. In this example, a sputtering apparatus is also employed. The substrate 2, on which the photoresist pattern 1 is formed, is directly set onto the sample table 6 of the sputtering apparatus so that a region 11 of the substrate 2, on which the film 7 having a tapered region 10 is formed, is not located directly below the target 5. According to this configuration of the substrate 2 against the target 5, the region 11 is positioned outside a region which is directly under the target 5. Thus, particles sputtered from the target 5 reach the substrate 2 from an incident direction which is oblique relative to the substrate 2. The vacuum grease may fill the gap between the substrate 2 and the sample table 6 for improving the thermal radiation efficiency. Particles 9 sputtered from the target 5 go toward the sample table 6 and reach the region 11 of the substrate 2 from the incident direction. Then, a film is formed on the region 11, having a thickness distribution (sputtering rate) corresponding to the shadow which the photoresist pattern 1 creates on the substrate in accordance with an angle between the substrate 2 and the incident direction. The unnecessary part of the film 8 is removed by the lift-off method as in the first example, thereby obtaining the film 7 having the purposed tapered region 10. With this method, since it is unnecessary to raise the substrate 2 obliquely, it is possible to form a film on a relatively large substrate.

In the above description, the film is formed by the sputtering method as an example. However, other methods such as a vapor deposition method, and a CVD method can also be used. In such methods, the particles which reach the substrate may be molecules or atoms which constitute a film.

Next, the shape of the tapered region formed by the above methods will be described. The tapered region shown in the second example will be described with reference to FIG. 3 as an example.

Figure 3:
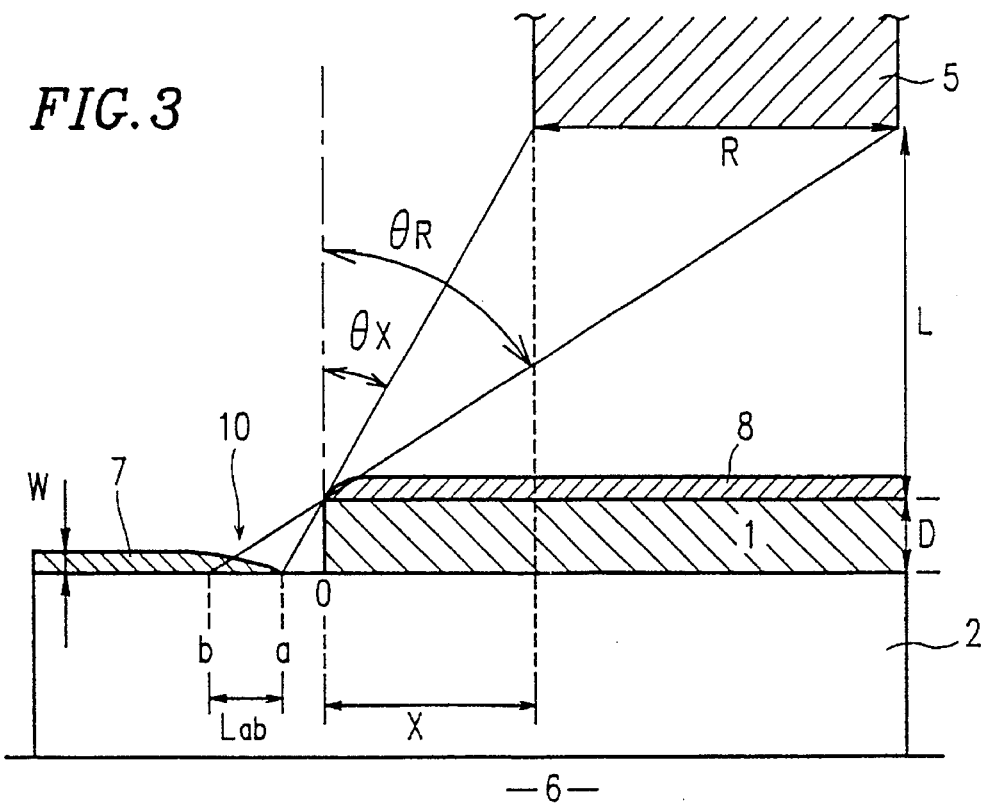
FIG. 3 is a cross-sectional view showing the mechanism of an example according to the present invention.

In FIG. 3, D represents the thickness of the photoresist pattern 1, L, the distance between the photoresist pattern 1 and the target 5, and R, the diameter of the target 5. The position of the edge portion of the photoresist pattern 1 is aligned to the origin O, and X represents the distance between the origin O and the edge of the target when the target 5 is projected onto the surface of the sample table 6. When the target 5 is seen from the sample table 6, the region, from which the target 5 is concealed by the edge of the photoresist pattern 1 and cannot be seen (sputtered particles from the target 5 are shaded by the edge), is represented by a region between a and b. The region between a and b is to be a tapered region 10 having a distribution in the sputtering rate. Thus, a length $L_{ab}$ of the region between a and b is the length of the tapered region 10. The length $L_{ab}$ of the tapered region is represented by the following Equation.

$$L_{ab} = D \cdot \tan\theta_R - D \cdot \tan\theta_X = D \cdot \left(\frac{X+R}{L} - \frac{X}{L}\right) = \frac{D \cdot R}{L}$$

The tip of the taper and the end thereof are represented by the points a and b, respectively. However, the points a and b are not actually apparent and the profile of the tapered region is represented by a gentle curve for the following reasons. The distribution of the incident angle of the particles sputtered from the target 5 changes due to the material of the target and the condition of sputtering (pressure and the like), the thickness D gradually increases when a film is also formed on the photoresist pattern 1 during sputtering, or the particles which reach the substrate 2 move on the substrate 2. The shape of the tapered region 10 can be controlled by varying values of R, X, L, and D shown in FIG. 3. Moreover, it is necessary to set X at a sufficiently large value so as to prevent the tip of the tapered region from being in contact with the photoresist pattern 1. For example, in the case where the film is formed from the vertical direction on the photoresist pattern 1 having a thickness in the order of a micrometer (i.e., $X \leq 0$), the film may cover the side face of the photoresist pattern 1. Thus, it becomes difficult to perform the lift-off operation. As a result, a tapered waveguide is not obtained. Moreover, a tapered waveguide having a desire shape may not be obtained.

Figure 4:
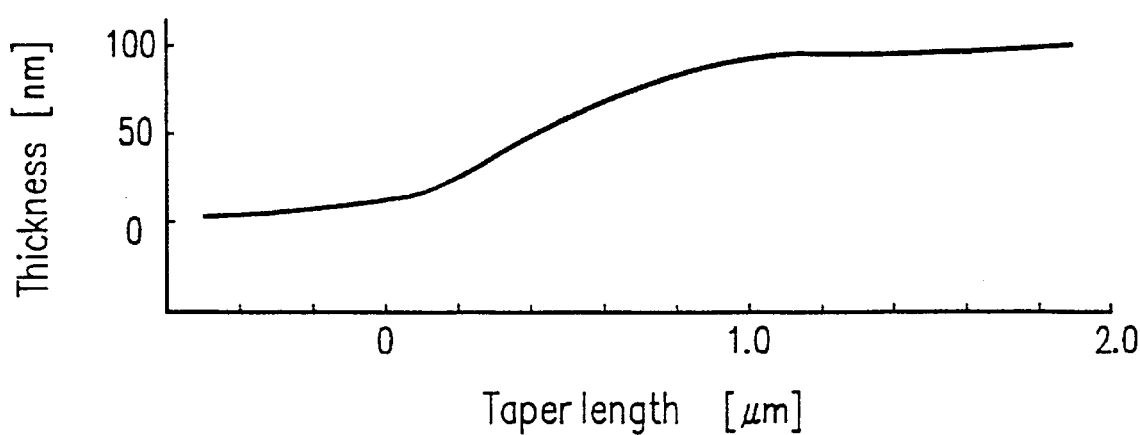
FIG. 4 is a graph showing a profile of a tapered waveguide obtained in the present invention.
Figure 5:
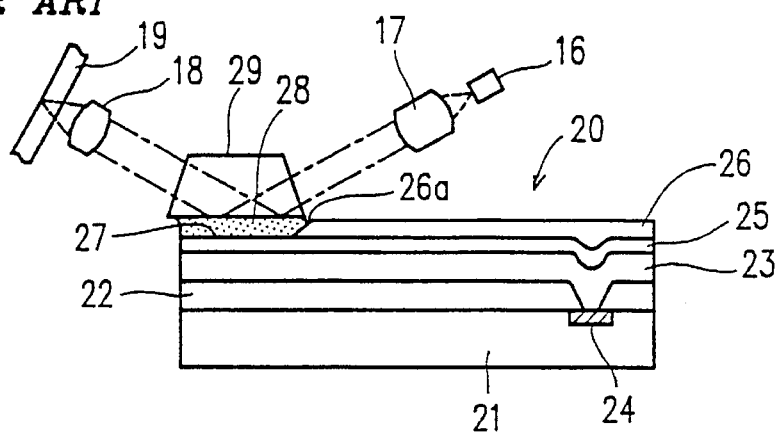
FIG. 5 is a cross-sectional view showing a conventional example.
Figure 6:
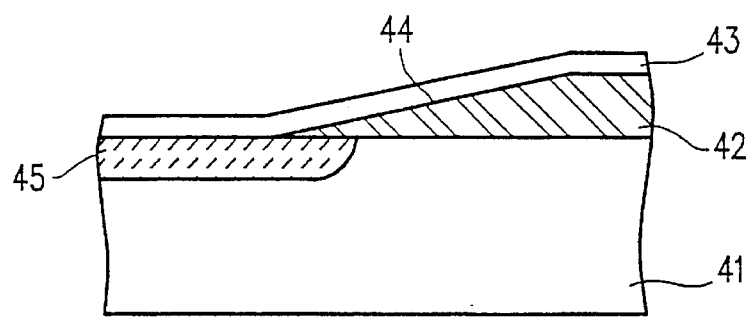
FIG. 6 is a cross-sectional view showing a conventional example.
Figure 7:
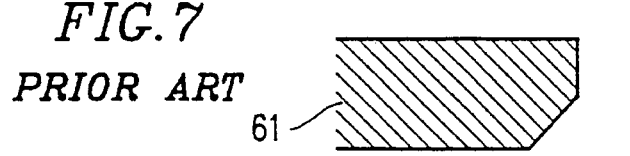
FIG. 7 is a schematic representation showing a conventional shadow mask method.
Figure 7:
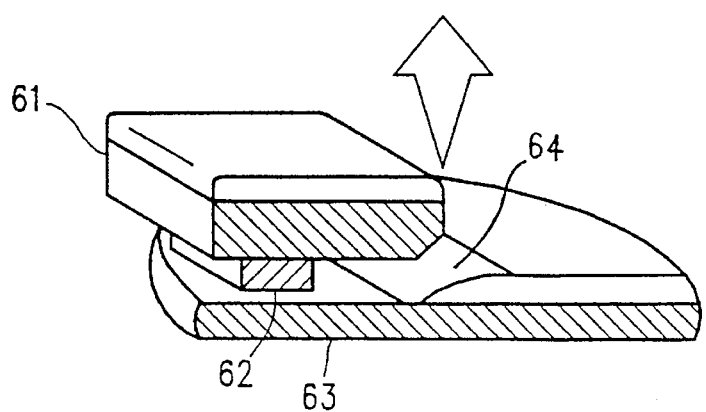
Figure 8A:
FIGS. 8A to 8I are cross-sectional views showing a process of producing the tapered region by wet etching.
Figure 8B:
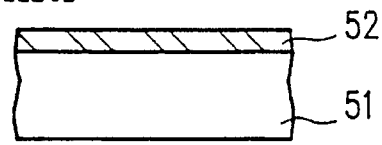
Figure 8C:
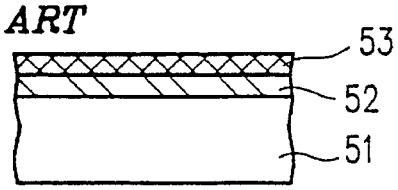
Figure 8D:
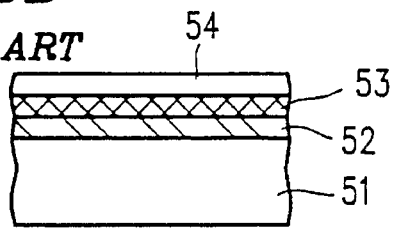
Figure 8E:
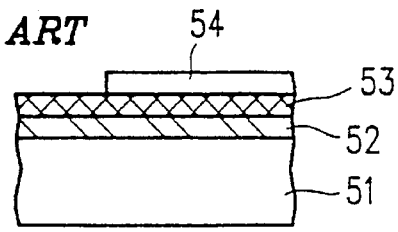
Figure 8F:
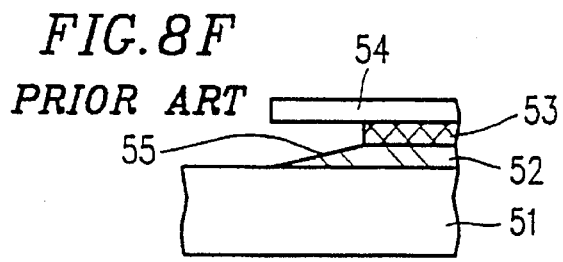
Figure 8G:
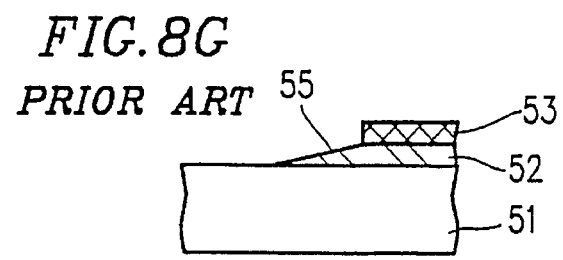
Figure 8H:
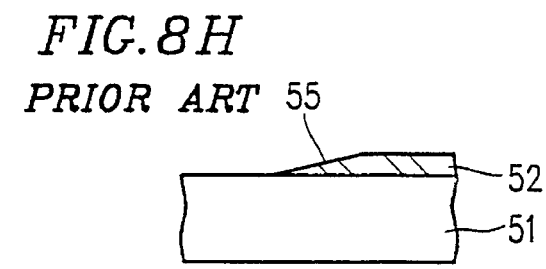
Figure 8I:
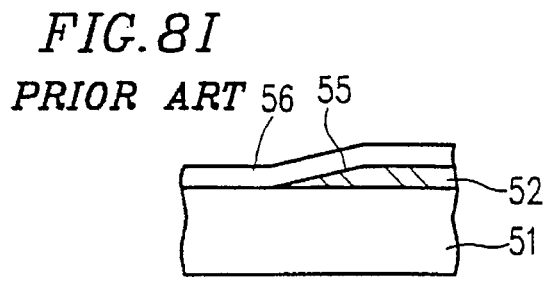

The result of measurement of the cross-sectional shape of the obtained tapered waveguide is shown in FIG. 4. The cross-sectional shape is measured by using a surface roughness tester after the photoresist pattern is removed. The values in the apparatus used for forming a film are as follows.

| | |
|---|---|
| Diameter of the target (R) | 75 mm |
| Distance between the edge of the target and the origin O (X) | 55 mm |
| Distance between the target and the substrate (L) | 105 mm |
| Thickness of the photoresist pattern (D) | 1 μm |

The length of the taper calculated based on these values and the actual values of the produced taper are shown in Table 1. From Table 1, it is understood that a shape almost the same as the desired one can be obtained. The actual values are obtained by the measurement after the lift-off. Therefore, the distance between the origin O and the point b cannot be obtained since the origin O is vague.

TABLE 1

| | $L_{Ob}$ (μm) | $L_{ab}$ (μm) | Angle of the taper (degree) |
|---|---|---|---|
| Calculated Values | 1.24 | 0.71 | 6.4 |
| Actual Values | — | about 0.8 | about 6 |

$L_{Ob}$: Distance between the Origin O and the point b

The angle of the taper can be controlled by the thickness W of the film 7 and the length of the taper Lab. FIG. 4 shows an example of the case where the film is formed so as to have a thickness of about 80 nm. In this case, the taper ratio is about 1:10.

As described above, a relatively short taper having a length of about 1 μm and a desired smooth shape can be obtained by producing a waveguide with the method of the present invention. The use of such a tapered waveguide makes it possible to produce a miniaturized tapered waveguide smaller than a conventional one with low optical loss. Moreover, the application of a conventional IC technique improves the mass production efficiency.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a tapered waveguide layer comprising the steps of:

forming a resist pattern on a substrate;

setting the substrate in an apparatus for forming a film such that particles constituting the film reach the substrate from a direction which is oblique relative to the substrate;

forming the film on a region of a surface of the substrate which is not covered with the resist pattern, the film having a thickness distribution corresponding to a shadow which the resist pattern creates on the substrate in accordance with an angle between the substrate and the direction; and removing the resist pattern, thereby forming the tapered waveguide layer consisting of the film on the substrate.

2. A method according to claim 1, wherein the step of setting the substrate includes the step of holding the substrate with the substrate tilted relative to a sample table of the apparatus.

3. A method according to claim 1, wherein the apparatus is a sputtering apparatus for forming the film by a sputtering method, and the step of setting the substrate includes the step of holding the substrate such that the region is positioned outside a region which is directly under a target of the sputtering apparatus.

4. A method according to claim 1, wherein the step of setting the substrate includes the step of holding the substrate onto means for cooling the substrate.

5. A method according to claim 4, wherein the means for cooling the substrate is set on a sample table of the apparatus, and the step of setting the substrate further comprises the step of filling a gap between the substrate and the means for cooling the substrate with a vacuum grease.

6. A method according to claim 4, wherein the means for cooling the substrate includes a chiller therethrough.

7. A method according to claim 1, wherein the particles constituting the film travel from a single target.

8. A method according to claim 1, wherein the particles constituting the film travel from a target, a surface of the substrate includes a first region and a second region which is adjacent to the first region at an origin in section, the step of setting the substrate includes the step of setting the substrate such that the first region is closer to the target than the origin, and the step of forming the resist pattern includes the step of forming the resist pattern on the first region.

9. A method according to claim 8, wherein the step of setting the substrate includes the step of holding the substrate with the substrate tilted relative to a sample table of the apparatus.

10. A method according to claim 8, wherein the step of setting the substrate includes the step of holding the substrate onto means for cooling the substrate.

11. A method according to claim 10, wherein the means for cooling the substrate is set on a sample table of the apparatus, and the step of setting the substrate further comprises the step of filling a gap between the substrate and the means for cooling the substrate with a vacuum grease.

12. A method according to claim 10, wherein the means for cooling the substrate includes a chiller therethrough.

* * * * *